United States Patent
Van Der Linden et al.

(10) Patent No.: US 7,780,144 B2
(45) Date of Patent: Aug. 24, 2010

(54) VALVE, IN PARTICULAR FOR A HIGH-PRESSURE PUMP OF A FUEL INJECTION SYSTEM FOR AN INTERNAL COMBUSTION ENGINE

(75) Inventors: Dietmar Van Der Linden, Rietenau (DE); Walter Fuchs, Stuttgart (DE); Andreas Dutt, Stuttgart (DE); Dieter Tuchel, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 579 days.

(21) Appl. No.: 10/579,852

(22) PCT Filed: Sep. 14, 2004

(86) PCT No.: PCT/DE2004/002041
§ 371 (c)(1),
(2), (4) Date: May 17, 2006

(87) PCT Pub. No.: WO2005/052358
PCT Pub. Date: Jun. 9, 2005

(65) Prior Publication Data
US 2007/0068580 A1    Mar. 29, 2007

(30) Foreign Application Priority Data
Nov. 25, 2003    (DE) ................... 103 55 030

(51) Int. Cl.
*F16K 1/42*    (2006.01)
(52) U.S. Cl. .................... 251/359; 137/539
(58) Field of Classification Search ............ 137/539, 137/539.5; 251/359
See application file for complete search history.

(56) References Cited

U.S. PATENT DOCUMENTS

| | | | | |
|---|---|---|---|---|
| 1,935,978 A | * | 11/1933 | Harbison | 137/533.13 |
| 2,286,841 A | * | 6/1942 | Smith | 137/537 |
| 2,927,737 A | | 3/1960 | Zeuch et al. | |
| 2,999,499 A | * | 9/1961 | Willet | 604/83 |
| 3,010,435 A | * | 11/1961 | Abrams | 91/443 |
| 3,387,790 A | * | 6/1968 | De Luca | 239/453 |
| 4,736,768 A | * | 4/1988 | Tsubouchi et al. | 137/514 |
| 5,004,009 A | * | 4/1991 | Bunce | 137/512.3 |

(Continued)

FOREIGN PATENT DOCUMENTS

DE    42 13 798 A1    10/1993

(Continued)

*Primary Examiner*—John Rivell
*Assistant Examiner*—William McCalister
(74) *Attorney, Agent, or Firm*—Ronald E. Greigg

(57) ABSTRACT

A valve having a valve member, which cooperates with a valve seat formed in a housing part in order to control a connection, and the valve seat has an at least approximately conical seat face, which is located at a transition of the connection from a portion of small diameter to a portion of large diameter. The seat face is adjoined, on its side oriented toward the portion of large diameter, by at least one face which is more markedly inclined relative to the longitudinal axis of the connection than the seat face, and on its side oriented toward the portion of small diameter, the seat face is adjoined by at least one face which is less markedly inclined relative to the longitudinal axis of the connection than the seat face.

3 Claims, 3 Drawing Sheets

U.S. PATENT DOCUMENTS

| | | | |
|---|---|---|---|
| 5,358,383 A | 10/1994 | Eisenbacher et al. | |
| 5,374,167 A * | 12/1994 | Merbold | 417/446 |
| 5,582,204 A * | 12/1996 | Hiranuma et al. | 137/539 |
| 5,715,996 A * | 2/1998 | Cooper et al. | 239/533.7 |
| 6,105,610 A * | 8/2000 | Watkins et al. | 137/516.29 |
| 6,311,901 B1 | 11/2001 | Imoehl et al. | |
| 6,334,434 B1 | 1/2002 | Imoehl et al. | |
| 6,382,380 B1 * | 5/2002 | Shimada et al. | 192/59 |
| 6,616,071 B2 * | 9/2003 | Kitamura et al. | 239/533.12 |
| 6,834,845 B2 * | 12/2004 | Finke et al. | 251/129.14 |
| 6,851,659 B2 * | 2/2005 | Zutt et al. | 251/359 |
| 2002/0030124 A1 | 3/2002 | Imoehl | |
| 2002/0050536 A1 | 5/2002 | Imoehl | |
| 2005/0016599 A1 * | 1/2005 | Talaski | 137/539 |

FOREIGN PATENT DOCUMENTS

| | | | |
|---|---|---|---|
| DE | 103 45 154 A1 | | 4/2004 |
| FR | 981.999 | | 6/1951 |
| FR | 981999 | * | 6/1951 |
| WO | WO 9964202 A1 | * | 12/1999 |

* cited by examiner

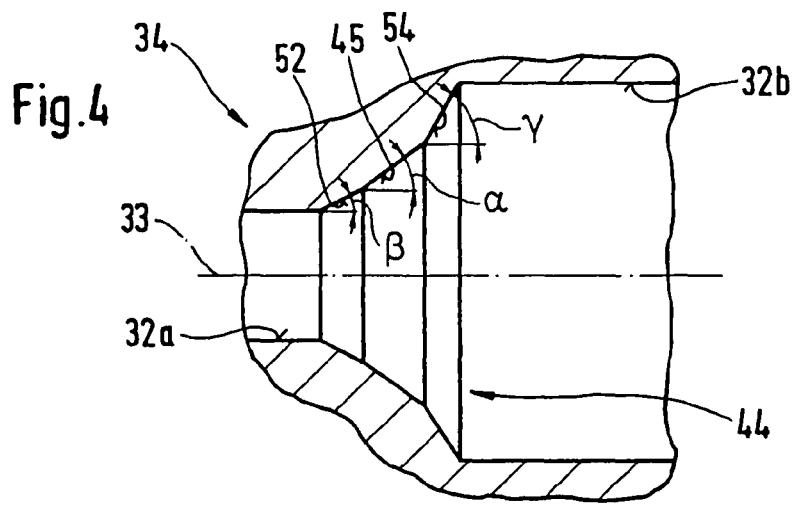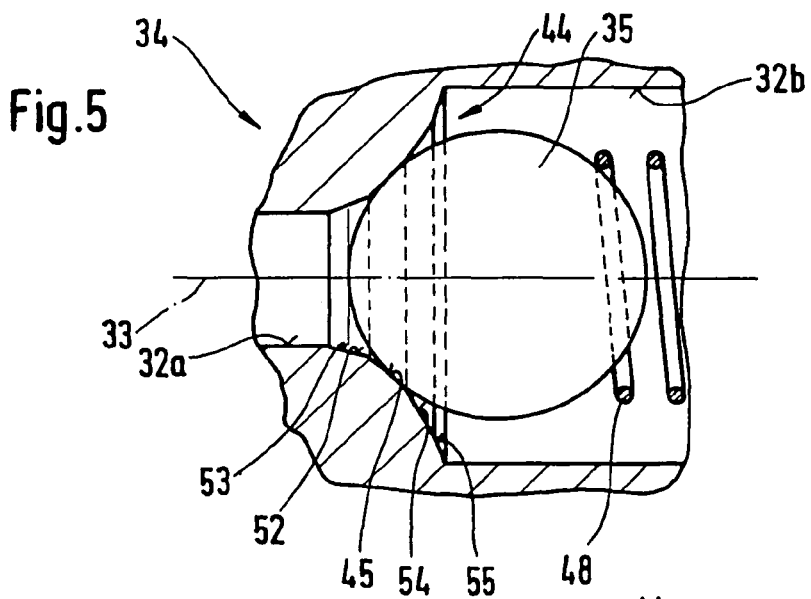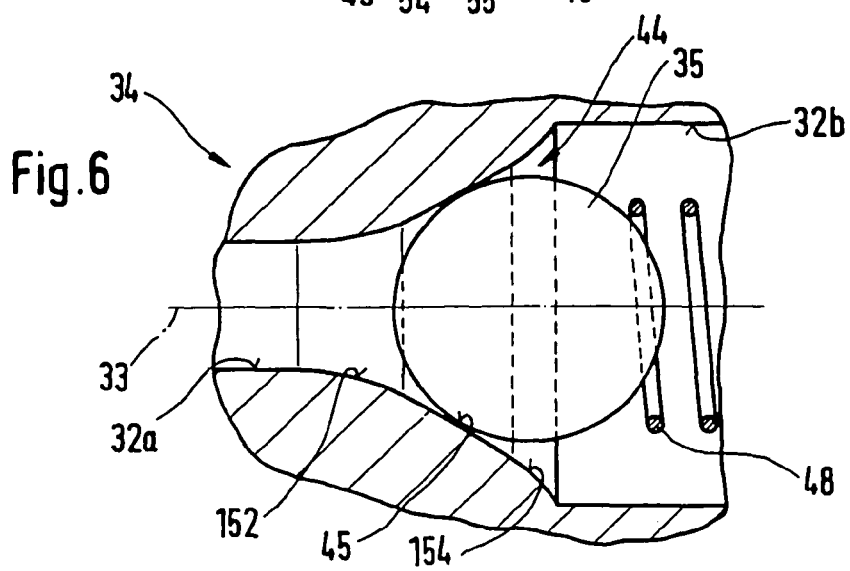

VALVE, IN PARTICULAR FOR A HIGH-PRESSURE PUMP OF A FUEL INJECTION SYSTEM FOR AN INTERNAL COMBUSTION ENGINE

CROSS REFERENCE TO RELATED APPLICATIONS

This application is a 35 USC 371 application of PCT/DE 2004/002041 filed on Sep. 14, 2004.

BACKGROUND OF THE INVENTION

1. Field of the Invention

The invention is directed to an improved valve for a high-pressure pump of a fuel injection system for an internal combustion engine.

2. Description of the Prior Art

A high-pressure pump with such a valve of the type with which this invention is concerned is known from German Patent Disclosure DE 197 44 577 A1. This high-pressure pump has a housing in which the valve, embodied as a check valve, is disposed. The valve has a valve member in the form of a ball, which cooperates with a valve seat formed in the housing part in order to open and close a communication of a pump work chamber of the high-pressure pump with a fuel outlet. The valve seat has an at least approximately conical seat face. To achieve sure sealing of the valve seat by the valve member, the shape of the seat face in terms of roundness and its surface smoothness must be manufactured very precisely. This requires complicated machining of the seat face, for instance by means of grinding. In the known valve, the seat face is large, so that its machining requires a large tool and is time-consuming and under some circumstances leads to the removal of a large amount of material. If the housing part of the high-pressure pump is hardened, the hardened surface layer of the housing part might be removed under some circumstances, and in that case there is no longer adequate strength of the seat face, which is hence subject to severe wear. Furthermore, the flow through the known valve is not optimal, because of the major flow deflection and the attendant flow losses of the seat face.

SUMMARY AND ADVANTAGES OF THE INVENTION

The valve of the invention has the advantage over the prior art that the seat face is markedly stepped by the faces of deviating inclination that adjoin it and is thus easier to machine, is short in length, and requires less removal of material, so that with a hardened housing part, the hardened surface layer is also preserved at the seat face. Moreover, by means of the faces adjoining the seat face, a gradual deflection of the flow is achieved, thus reducing the flow losses.

Advantageous features and refinements of the valve of the invention are disclosed, including embodiments which make a further reduction in the size of the seat face possible and hence a simplification of its machining and a further reduction in the flow losses. The high-pressure pump of the invention is simple to manufacture, and a good flow from its inlet valve and/or outlet valve is attained.

Drawing BRIEF DESCRIPTION OF THE DRAWINGS

Further exemplary embodiments of the invention are described herein below, with reference to the drawings, in which:

FIG. 4 shows the valve in a second exemplary embodiment in the pre-machined state;

FIG. 5 shows the valve in a third exemplary embodiment in the completely machined state; and FIG. 6 shows the valve in a fourth exemplary embodiment in the completely machined state.

DESCRIPTION OF THE PREFERRED EMBODIMENTS

Figure 1:
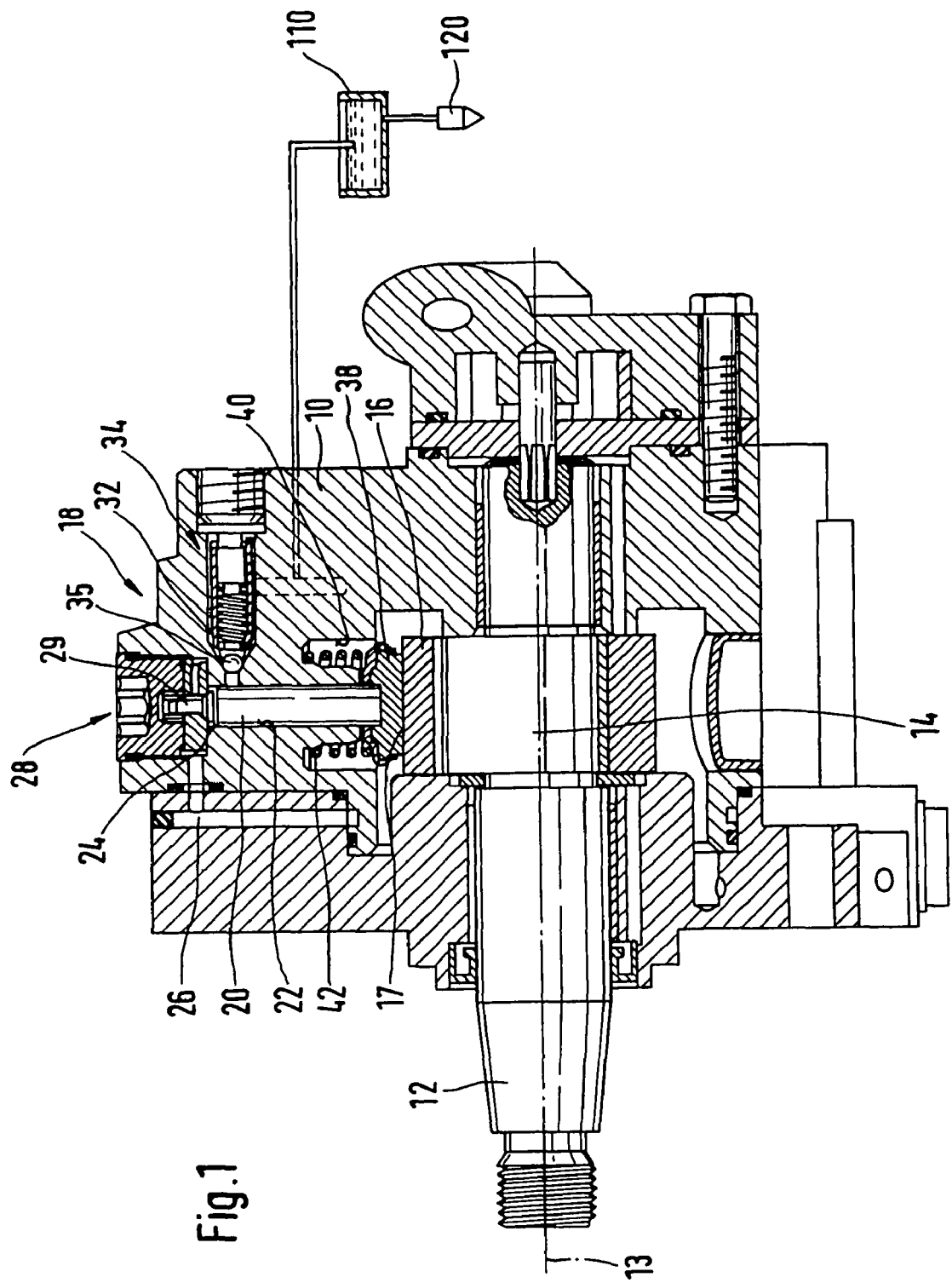
FIG. 1 shows a high-pressure pump for a fuel injection system of an internal combustion engine.

In FIGS. 1 through 6, a high-pressure pump for a fuel injection system of an internal combustion engine is shown. The high-pressure pump, as shown in FIG. 1, has a housing 10, which is embodied in multiple parts and in which a drive shaft 12 is disposed. The drive shaft 12 is supported rotatably in the housing 10 and is driven to rotate by the engine in a manner not shown in further detail.

The drive shaft 12 has a shaft portion 14, embodied eccentrically to its axis of rotation 13, on which a transmission element 16 in the form of a polygonal ring is rotatably supported. The high-pressure pump has at least one and preferably a plurality of pump elements 18 disposed in the housing 10, each having a pump piston 20 that is driven by the polygonal ring 16 in a reciprocating motion in an at least approximately radial direction to the axis of rotation 13 of the drive shaft 12. The pump piston 20 is guided tightly displaceably in a cylinder bore 22 in the housing 10, or in an insert in the housing 10, and with its face end oriented away from the transmission element 16, it defines a pump work chamber 24 in the cylinder bore 22. The pump work chamber 24, via a fuel inlet conduit 26 extending in the housing 10, has a communication with a fuel inlet, such as a feed pump. At the orifice of the fuel inlet conduit 26 into the pump work chamber 24, there is an inlet valve 28, which opens into the pump work chamber 24 and has a spring-loaded valve member 29. The pump work chamber 24 furthermore, via a fuel outlet conduit 32 extending in the housing 10, has a communication with an outlet, which communicates for instance with a reservoir 10. Communicating with the reservoir 110 are one or more injectors 120, through which fuel is injected to the engine. At the orifice of the fuel outlet conduit 32 into the pump work chamber 24, there is an outlet valve 34, which opens out from the pump work chamber 24 and likewise has a spring-loaded valve member 35.

The pump piston 20 is braced via a tappet 38 on the polygonal ring 16, which is supported on the shaft portion 14. The tappet 38 is embodied as sleevelike, and with its closed end it rests on the polygonal ring 16. The tappet 38 is guided displaceably with little play in a bore 40 in the housing 10 of the high-pressure pump. The pump piston 20 is kept with its piston base in contact with the inside of the bottom of the tappet 38 by a prestressed restoring spring 42, and the tappet 38, with the outside of its bottom, is kept in contact with the polygonal ring 16 by the restoring spring 42. In the rotary motion of the drive shaft 12, the polygonal ring 16 is not moved with the drive shaft, but because of the eccentric portion 14, it executes a motion perpendicular to the axis of rotation 13 of the drive shaft 12, which brings about the reciprocating motion of the pump piston 20. The polygonal ring 16 has a flattened face 17 in its outer jacket for each pump element 18, and the tappet 38 rests on this face. In the intake stroke of the pump piston 20, in which the pump piston moves radially inward, the pump work chamber 24 is filled with fuel through the fuel inlet conduit 26 with the inlet valve 28 open, the outlet valve 34 being closed. In the pumping stroke of the pump piston 20, in which the pump piston moves radially outward, fuel is pumped at high pressure by the pump piston 20 to the reservoir 110 through the fuel outlet conduit 32 with the outlet valve 34 open, the inlet valve 28 being closed.

In each of FIGS. 2 through 6, a valve of the high-pressure pump is shown enlarged; this may be the inlet valve 28 or the outlet valve 34 of the high-pressure pump. The valve will be described in further detail below in terms of the outlet valve 34. The fuel outlet 32 extends as a bore in the housing 10 of the high-pressure pump; the bore has one portion 32a of small diameter, opening into the pump work chamber 24, and one portion 32b of large diameter, discharging at the outside of the housing 10. The valve member 35, embodied as a ball, of the valve 34 is located in the bore portion 32. The diameter of the valve member 35 is less than the diameter of the bore portion 32b, but greater than the diameter of the bore portion 32a. At the transition between the bore portion 32a, 32b, a valve seat 44 is formed in the housing 10, and the valve member 35 cooperates with it to close and open the fuel outlet 32 from the pump work chamber 24. The valve member 35 is pressed against the valve seat 44 by a closing spring 48, fastened between this valve member and a closure element 46 that closes off the bore portion 32b toward the outside. When the pressure in the pump work chamber 24, which acts on the valve member 35 via the bore portion 32a, generates a greater force against the valve member 35 than the closing spring 48 does, the valve member 35 lifts from the valve seat 44 and opens the fuel outlet. A further bore 50, which communicates with the reservoir 110 via a line, discharges into the bore portion 32b.

Figure 2:
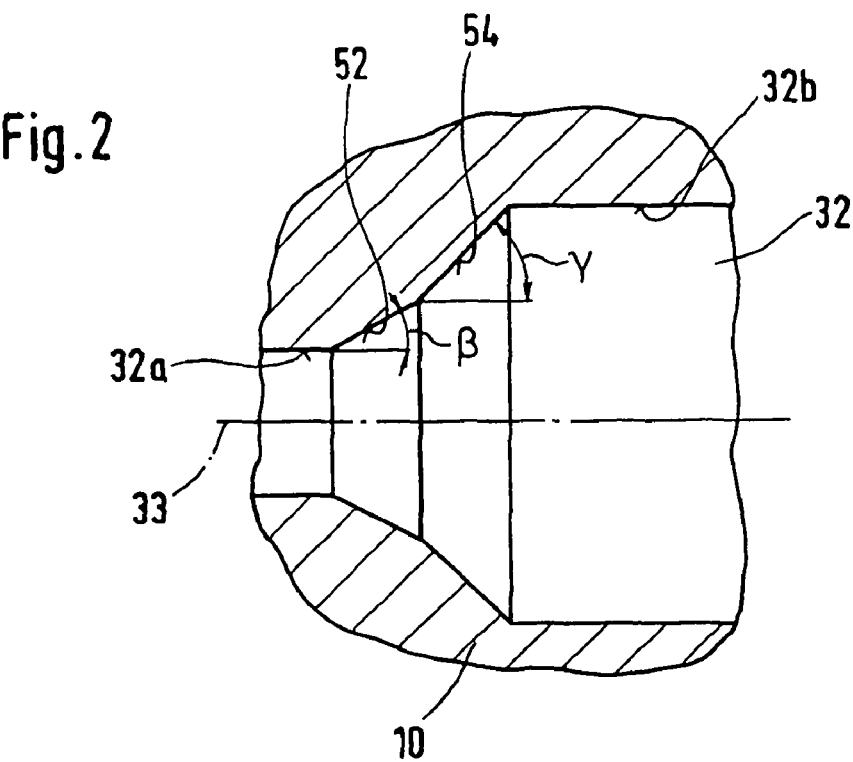
FIG. 2 shows a valve of the high-pressure pump in an enlarged view of a first exemplary embodiment in the pre-machined state.
Figure 3:
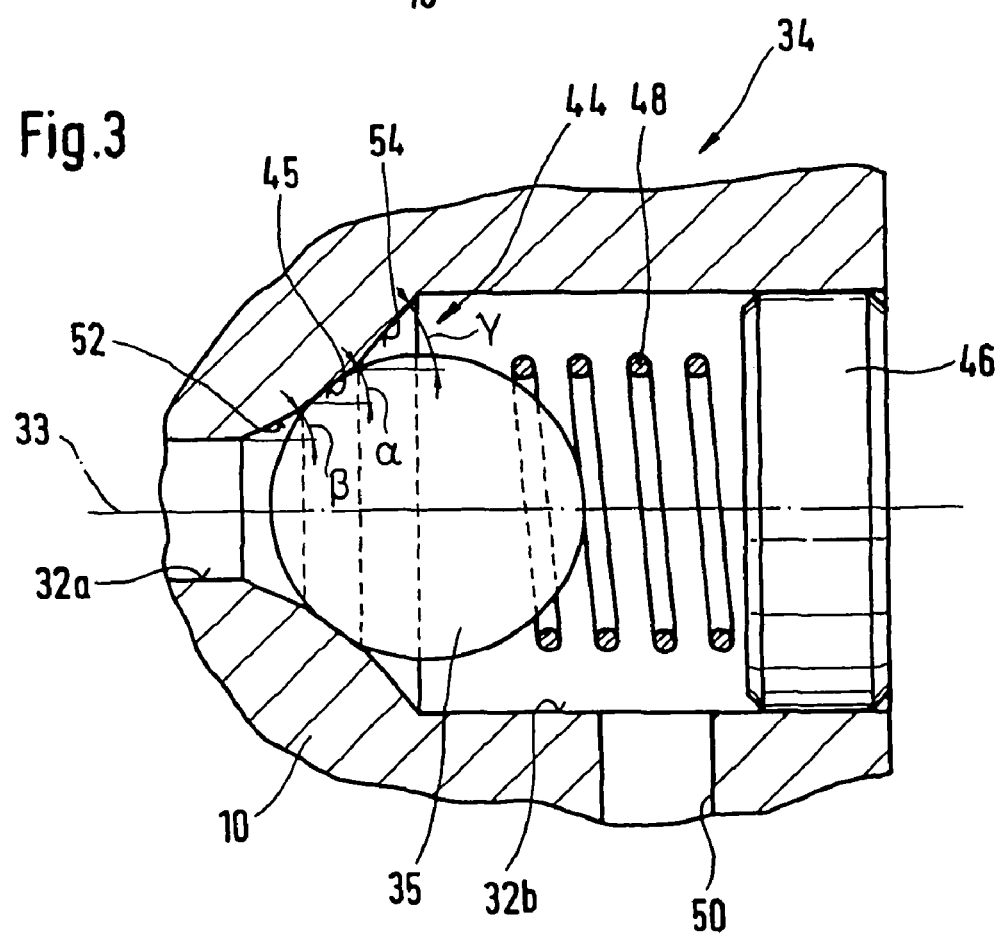
FIG. 3 shows the valve in a completely machined state.

In FIGS. 2 and 3, the valve 34 is shown in a first exemplary embodiment. In FIG. 2, the housing 10 of the high-pressure pump is shown in a pre-machined state, in which the valve seat 44 has two faces 52, 54, inclined variously markedly toward the longitudinal axis 33 of the bore portions 32a, 32b, each face being at least approximately conical. The bore portion 32b is adjoined first by the face 52 that is markedly inclined toward the longitudinal axis 33, and this face is adjoined, toward the bore portion 32a, by the face 54 that is less markedly inclined toward the longitudinal axis 33. Both the bore portions 32a, 32b and the faces 52 and 54 are machined by metal-cutting machining of the housing 10, by means of drilling and/or milling. In this pre-machined state, the housing 10 is hardened, and then, by means of a grinding and/or honing and/or metal-cutting tool, an at least approximately conical seat face 45 is made at the transition between the faces 52, 54, resulting in the completely machined state shown in FIG. 3. For producing the seat face 45, all that is needed is a tool that is short in the direction of the longitudinal axis 33, and only a slight amount of material has to be removed from the housing 10, so that the hardened surface layer of the housing 10 is preserved. As a result of the grinding and/or honing and/or metal-cutting, the seat face 45 gains the requisite roundness with respect to the longitudinal axis 33 and the requisite surface roughness for achieving sure sealing of the fuel outlet 32 when the valve member 35 is resting on the seat face 45. The seat face 45 has only a short length in the direction of the longitudinal axis 33. The seat face 45 is inclined toward the longitudinal axis 33 at an angle α of for instance approximately 35° to 45°, resulting in a cone angle of between approximately 70° and 90°. FIG. 3 shows that the face 52 forms an acute angle β with the longitudinal axis 33 of the bore 32, seat face 45 forms an acute angle α with the longitudinal axis 33 of the bore 32, and face 54 forms an acute angle γ with the longitudinal axis 33 of the bore 32. FIG. 3 shows that β is less than α and that γ is more than α. For controlling the fuel outlet 32, the valve member 35 cooperates with the seat face 45. The faces 52, 54 adjoin the seat face 45, one on each side, and form an inlet and outlet region for the outflowing fuel.

In FIG. 4, the valve 34 is shown in a second exemplary embodiment. In a departure from the first exemplary embodiment, the at least approximately conical seat face 45, which is adjoined on both sides by the likewise at least approximately conical faces 52, 54, is already present in the pre-machined state in FIG. 4. In the pre-machined state in FIG. 4, the housing 10 of the high-pressure pump is hardened. Next, the seat face 45 is machined by means of a grinding and/or honing tool, so that it is given the requisite shape. As a result of the grinding and/or honing and/or metal-cutting, the seat face 45 is given the requisite roundness with respect to the longitudinal axis 33 and the requisite surface roughness to achieve sure sealing of the fuel outlet 32 when the valve member 35 is resting on the seat face 45.

In FIG. 5, the valve 34 is shown in a third exemplary embodiment, in which the valve 34 is embodied essentially identically to the second exemplary embodiment, but the face 52 adjoining the seat face 45 and/or the face 54 is each adjoined by at least one further at least approximately conical face 53 and 55, respectively. The face 53 adjoining the face 52 on its side facing away from the seat face 45 is inclined more markedly toward the longitudinal axis 33 than the face 52. The face 55, adjoining the face 54 on its side facing away from the seat face 45, is inclined less markedly toward the longitudinal axis 33 than the face 54. The faces 53, 55 can be adjoined by further faces, and the faces adjoining the face 53 are inclined increasingly more markedly toward the longitudinal axis 33, while the faces adjoining the face 55 are inclined increasingly less markedly toward the longitudinal axis 33.

In FIG. 6, the valve 34 is shown in a fourth exemplary embodiment, in which the seat face 45 is adjoined on both sides by faces 152 and 154 that are each curved convexly toward the longitudinal axis 33. The inclination of the face 52 to the longitudinal axis 33 increases with increasing distance from the seat face 45 in the direction of the longitudinal axis 33, while the inclination of the face 154 decreases with increasing distance from the seat face 45 in the direction of the longitudinal axis 33. The overall result is a trumpet-bell-shaped course of the transition from the bore portion 32a to the bore portion 32b in which the at least approximately conical seat face 45 is located. In the pre-machined state, the two faces 152 and 154 adjoin one another continuously, and the at least approximately conical seat face 45 is then created, as in the exemplary embodiments explained above, by machining using a grinding and/or honing and/or metal-cutting tool. As a result of the grinding and/or honing and/or metal-cutting, the seat face 45 is given the requisite roundness with respect to the longitudinal axis 33 and the requisite surface roughness to achieve sure sealing of the fuel outlet 32 when the valve member 35 is resting on the seat face 45. In this trumpet-bell-shaped embodiment of the faces 152 and 154, an especially good flow through the fuel outlet 32, with low flow losses, is achieved.

The foregoing relates to a preferred exemplary embodiment of the invention, it being understood that other variants and embodiments thereof are possible within the spirit and scope of the invention, the latter being defined by the appended claims.

The invention claimed is:

1. In a valve for a high-pressure pump of a fuel injection system for an internal combustion engine, the valve having a valve member which cooperates with a valve seat formed in a housing part on which valve seat the valve member rests when the valve is closed in order to close a bore through the housing part, the valve seat having an at least approximately conical seat face which is located at a transition of the bore from a portion of small diameter to a portion of large diameter, the conical seat face being formed as a section of a cone having a first cone angle between the seat face and a diametric longitudinal axis of the valve seat, the improvement wherein the conical seat face, on its side oriented toward the portion of large diameter, is adjoined by a first conical surface formed as a section of a cone having a second cone angle between the first conical surface and the longitudinal axis which is larger than said first cone angle, wherein the conical seat face, on its side oriented toward the portion of small diameter, is adjoined by a second conical surface formed as a section of a cone having a third cone angle between the second conical surface and the longitudinal axis which is smaller than said first cone angle, wherein the first conical surface is adjoined by a third conical surface formed as a section of a cone having a fourth cone angle between the third conical surface and the longitudinal axis which is larger than said second cone angle, and wherein the second conical surface is adjoined by a fourth conical surface formed as a section of a cone having a fifth cone angle between the fourth conical surface and the longitudinal axis which is smaller than said third cone angle, resulting in an overall shape of the adjoined surfaces being a stepped trumpet bell shape, which flares out from the portion of small diameter to the portion of large diameter.

2. The valve in accordance with claim 1, wherein the conical seat face is machined from the side of the portion of the bore having the large diameter by means of grinding and/or honing and/or metal-cutting.

3. The valve in accordance with claim 1, wherein the housing part is hardened, at least in the region of the conical seat face.

* * * * *